United States Patent [19]
Paton et al.

[11] 4,109,934
[45] Aug. 29, 1978

[54] SELF-CONTAINED FRICTIONALLY DAMPED RESILIENT SUSPENSION SYSTEM

[75] Inventors: Hamilton Neil King Paton, 2521 W. Montlake Pl. East, Seattle, Wash. 98112; John B. Skilling, 3000 Webster Point Rd., Wash. 98105; Frank F. Smith, Albuquerque, N. Mex.

[73] Assignees: Hamilton Neil King Paton; John B. Skilling, both of Seattle, Wash.

[21] Appl. No.: 631,995

[22] Filed: Nov. 14, 1975
(Under 37 CFR 1.47)

Related U.S. Application Data

[63] Continuation-in-part of Ser. No. 457,425, Apr. 3, 1974, abandoned.

[51] Int. Cl.² ............................................. B60G 11/24
[52] U.S. Cl. .................................. 280/716; 267/9 B; 267/63 R
[58] Field of Search ............. 267/9 R, 9 B, 9 A, 9 C, 267/63 R, 3, 140, 141, 152, 153; 105/197 A, 197 D, 224.1, 224 R; 280/716

[56] References Cited
U.S. PATENT DOCUMENTS

| | | | |
|---|---|---|---|
| 1,973,816 | 9/1934 | Kruckenberg et al. | 267/63 R X |
| 2,356,743 | 8/1944 | Light | 267/9 |
| 3,120,382 | 2/1964 | Paulsen | 267/63 R |
| 3,865,443 | 2/1975 | Janes | 267/63 R X |
| 3,961,582 | 6/1976 | Paton et al. | 267/63 R X |
| 3,961,584 | 6/1976 | Paton et al. | 267/3 X |
| 3,984,125 | 10/1976 | Paton et al. | 267/63 R X |

FOREIGN PATENT DOCUMENTS

| | | | |
|---|---|---|---|
| 498,598 | 12/1953 | Canada | 267/63 R |
| 140,465 | 6/1921 | United Kingdom | 267/63 R |
| 499,414 | 1/1939 | United Kingdom | 267/63 R |

*Primary Examiner*—John J. Love
*Attorney, Agent, or Firm*—Dowrey & Cross

[57] ABSTRACT

A shock insulated suspension system is provided with unique variable rate rod springs and co-related variable rate friction damping means. Each rod spring includes an elongated solid body of elastomeric material which, when subjected to radially directed compression loads and allowed to deform freely without rotation, produces a non-linear or variable spring rate proportional to the ratio of the areas of its loaded to unloaded surfaces. Rod springs constitute the main suspension spring elements, and additionally may constitute the damping means spring elements, if desired.

3 Claims, 31 Drawing Figures

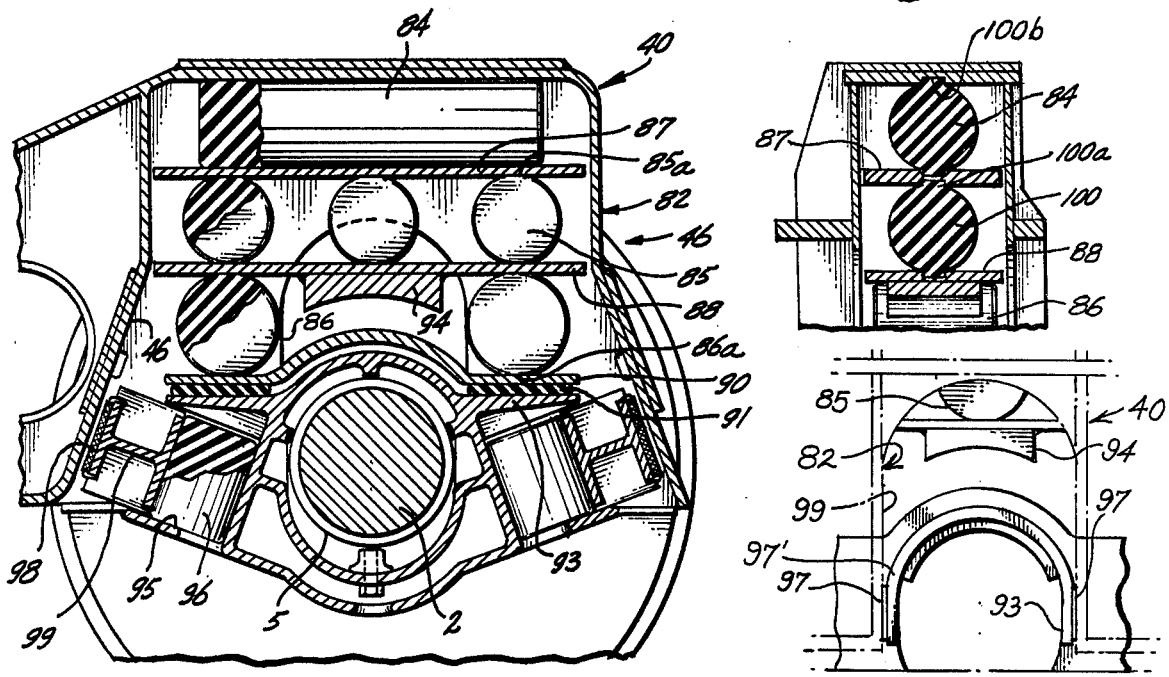
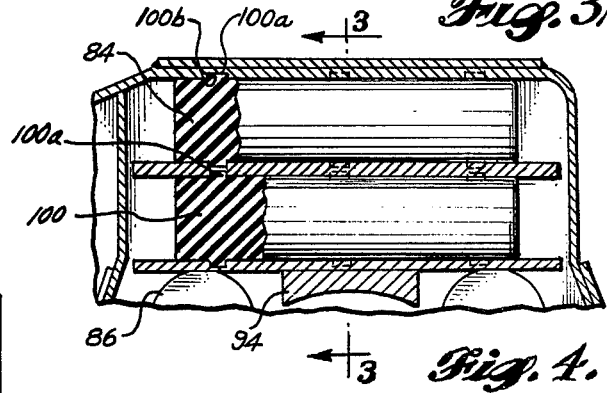
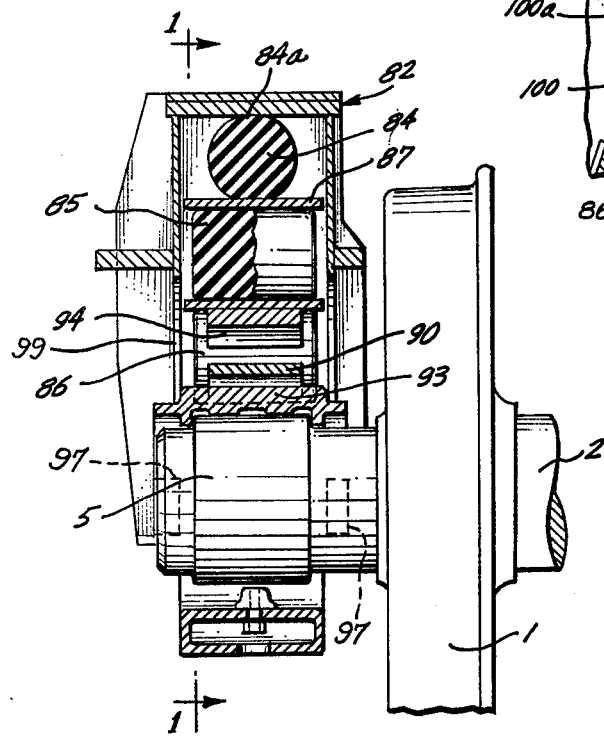
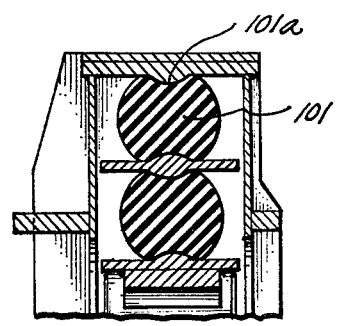

SELF-CONTAINED FRICTIONALLY DAMPED RESILIENT SUSPENSION SYSTEM

BACKGROUND OF THE INVENTION

This application is a continuation-in-part of application Ser. No. 457,425, filed Apr. 3, 1974 now abandoned.

This invention relates to suspension systems, and more particularly to suspension systems which utilize elastomeric compression springs. The suspension system of this invention is illustrated and described herein in the environment of a railcar truck and a rubber tired vehicle; however, the invention in its broadest form is not limited to a specific environment or application.

Most conventional suspension systems employ some sort of main spring element for supporting the sprung structure (e.g., the body of a vehicle in a vehicular suspension). In these suspension systems, conventional coil compression springs are utilized most commonly as the main spring element; however, these springs deflect linearly in response to the application of compressive loads, or produce a linear load-deflection spring curve, and therefore are selected on the basis of the average anticipated suspension load. Above and below the average load, the spring provides insufficient and excessive spring force, respectively. In addition, conventional coil compression springs tend to bottom under high load or shock conditions. Typically, the compression limits of such springs are about one third their original length and, upon application of compressive loads or shock forces of sufficiently high magnitude, are compressed to the point that their coils bottom or come into metal to metal contact with one another. Coil springs, therefore, do not offer the most effective main spring suspension means in many applications, especially vehicular suspensions, subject to a wide range of load conditions, high magnitude shock forces or large displacements. Another disadvantage of coil springs is that they have little or no inherent damping, a property which is highly desirable in many vehicular suspension systems.

Elastomeric springs of the shear, or combination shear compression type, have been used extensively in vehicular suspensions, particularly railcar suspensions; however, fears of environmental effects, cold flow, creep, fatigue and other failure phenomena have limited the usage of elastomeric springs to suspensions subject to small magnitude displacements or loads or have required supplemental coil springs or load distribution devices to prevent over stressing of the elastomeric springs. Some known elastomeric compression springs, for example, employ end plates which are bonded to the opposed force bearing surfaces of the spring in order to increase the load bearing capacity of the spring. Destructive stress concentrations, however, tend to develop adjacent the end plate bonds under high compressive loads and may lead to bond breakage or rupture of the body of elastomeric material. Such bonded end plate elastomeric springs are disclosed in U.S. Pat. No. 3,461,816, issued to Beck and U.S. Pat. No. 2,154,586, issued to Stern. Elastomeric shear compression or sandwich springs, which typically employ flat inter-leaved rubber spring elements in V or chevron formations, suffer from similar problems.

Other types of known elastomeric compression springs employ solid bodies of elastomeric material of square or rectangular cross sectional configuration. In many practical applications, however, these springs tend to develop undersirable stress concentrations at the sharp corners between adjacent spring surfaces. Such stress concentrations may lead to rupture of the spring material under high compressive loads. Toroidal elastomeric springs of generally circular cross sectional configuration also have been proposed, as in U.S. Pat. No. 3,515,382, issued to Gallagher. Toroidal springs, however, are highly undersirable in many applications, especially vehicular suspension systems, in which the spring elements must be mounted and operated in a confined space. Furthermore, toroidal springs tend to develop destructive hoop stresses upon application of high compressive loads.

Another known type of elastomeric spring utilizes an elastic solid roller body, formed of natural or artificial rubber. The roller body rolls about its longitudinal axis between two spaced apart load application surfaces as they are moved relatively in rotational or translational fashion. The spring force obtained is produced as the roller body is rolled between the load application surfaces, in repsonse to relative movement thereof, to a region of reduced spacing, where it is compressed radially. Such roller type elastomeric springs are disclosed in U.S. Pat. Nos. 2,712,742, 2,729,442, 2,819,063, 2,842,410, British Pat. No. 749,131 and German Pat. No. 2,189,897, all issued to Neidhart, and in U.S. Pat. No. 2,189,870, issued to Sluyter. The roller body or bodies employed in these roller type elastomeric springs, however, are subject to surface wear and destructive shear stresses which are produced by the rolling action between the load application surfaces. Additionally, destructive force couples, or torsional stresses, are produced as the force application axis, along which the compressive force of each load application surface is applied, shifts to one side or the other of the roller body centroid.

Still another known elastomeric spring which is generally similar to the roller type spring described previously except that the spring is compressed radially without rotational movement, is disclosed in U.S. Pat. No. 3,351,308, issued to Hirst. The arcuate load application surfaces between which the spring is sqeezed or compressed radially surround and confine the spring, and hence prevent free bluging of diagonally opposed portions of the curved spring side surfaces under all load conditions, especially upon application of high compressive loads which tend to produce substantial flattening of the spring. Consequently, if restrained excessively from free deformation, the spring tends to rupture or fail. To limit total spring deflection, the top casting and base are formed so that they engage one another in response to application of a sufficiently high downward load or impact force. When engaged, however, forces are transmitted directly between the top casting and base, and hence the spring is ineffective. That is, the spring system comprising two load application surfaces and the elastic spring body, in effect, bottoms in much the same manner as a conventional coil spring. The end result is that this spring system is of limited usefulness, and is unsuitable for use in many practical spring applications, such as vehicular suspension systems, in which high load or impact forces are to be encountered. Further, in addition to being of arcuate configuration, the load application surfaces between which the spring is compressed initially are spaced apart diagonally. Consequently, the spring is squeezed therebetween or is deflected radially along a deflection axis which extends in a diagonally inclined direction between these surfaces in response to application of a downward load applied along a vertical load application axis. That is, the deflection axis (diagonal) does not coincide with the load application axis (vertical). The end result is that destructive torsional forces, force couples and shear stresses are produced in the elastic spring body. Furthermore, due to such non-symmetrical spring loading with respect to vertically applied loads, two parallel springs must be used. Another generally similar suspension for railcar useage is disclosed in U.S. Pat. No. 1,484,954, issued to Masury.

In addition to the main spring elements, another important factor in the design and selection of a suspension system is the damping or shock absorbing means. There is much concern in the mobile vehicle industry, particularly in the railcar and truck-trailer fields, regarding problems caused by dynamic forces which produce high frequency vibration, resonant motion, etc. Prior art damping systems which attempt to eliminate or minimize these problems have largely utilized hydraulic shock absorbers or constant force friction elements. Hydraulic damping is velocity responsive (rather then load responsive) and hence tends to produce damage to the lading for higher frequency forcing modes. Most prior friction dampers for railcar useage employ coil springs for actuating the friction shoe (see U.S. Pat. No. 3,517,620, issued to Weber) and thus produce a linear rate damping force. Examples of additional similar prior art dampers are disclosed in U.S. Pat. Nos. 3,338,183, 3,486,465 and 3,545,385. Consequently, such prior friction dampers suffer from many or all of the disadvantages of coil springs mentioned above and may even require supplemental damping by hydraulic shock absorbers.

One type of prior railcar suspension including a friction damper, which employs a rubber compression pad for urging a friction shoe into frictional engagement with a friction surface, is disclosed in U.S. Pat. Nos. 2,356,743, and 2,357,264, both issued to Light, and in U.S. Pat. No. 2,295,554, issued to Cotrell. This suspension, however, due to the inclusion of coil springs as the main suspension spring elements, suffers from some or all of the above-mentioned disadvantages.

SUMMARY OF THE INVENTION

The invention utilizes one or more unique rod springs as the main suspension spring elements and preferably combines them with variable rate friction damping means to provide a suspension system which achieves matched springing and damping of controlled variable rate. The preferred variable rate damping means also include a rod spring.

The rod spring of this invention provides a non-linear or variable rate, load-deflection spring curve which may be controlled selectively. The rod spring comprises an elongated solid body of elastomeric material, preferably natural rubber or its equivalent, having diametrically opposed longitudinal load bearing surfaces and having a cross sectional configuration selected to provide a shape factor which varies in response to application of compressive loads. Shape factor is defined as the ratio of the area of the spring load bearing surfaces to the area of its non-load bearing surfaces which are free to bulge in response to an applied compressive load. The higher the shape factor, the greater the amount of load required to produce a certain spring deflection, and hence the steeper the spring curve obtained. That is, the spring becomes stiffer, or its resistance to further compression increases porportionally as its shape factor increases. Thus, it is possible, by selecting a cross sectional configuration which provides certain shape factors at various compressive loads, to control the spring curve obtained in order to obtain a variable rate spring curve of desired spring rate or stiffness.

The rod spring of this invention is positioned between, but preferably is not bonded to, two substantially parallel load application surfaces of generally planar configuration. The load application surfaces are so positioned that a compressive force can be applied to the spring in a radial direction along a deflection axis substantially perpendicular to the longitudinal axis of the body. That is, the load application axis, which is projected between and is normal to the faces of the load application surfaces, substantially coincides with the deflection axis. When compressed radially between such load applications surfaces, curved portions of the spring side and end surfaces adjacent the load application surfaces roll down freely into interfacing static contact therewith, thus increasing the area of the spring load bearing surfaces and increasing the spring shape factor. Consequently, the rod spring may be squeezed or compressed radially while its load bearing surfaces remain engaged in interfacing static fashion with their respective load application surfaces. Thus, shifting, sliding or rotational movement of the spring relative to the load application surfaces, and hence surface wear, destructive force couples or shear stresses are eliminated or minimized while achieving substantial deflections not possible with prior elastomeric compression springs.

Thus, it will be appreciated from the foregoing summary that this invention provides a highly effective suspension system which offers matched spring and damping forces of controlled rates, the spring or damping rates being controllable most effectively by selection of an appropriate rod spring shape factor. It is possible, of course, to utilize one or more rod springs as the main spring elements in combination with conventional dampers, for example hydraulic dampers. Furthermore, the rod spring of this invention for the first time provides an elastomeric spring capable of withstanding substantial compressions — from 30% to 50%, or higher, being practical — without suffering compression set, cold flow, etc. Consequently, the suspension system of this invention is highly versatile and may be employed successfully in many applications, for example, rubber tired and railcar vehicle suspensions subject to large displacements between the sprung and unsprung structures, which heretofore were ill-suited for usage with elastomeric springs.

These and other features, objects, and advantages of this invention will become apparent in the detailed description and claims to follow taken in conjunction with the accompanying drawings in which:

BRIEF DESCRIPTION OF THE DRAWINS

FIG. 1 is a longitudinal vertical section taken through a suspension system embodying the principals of the invention as applied to a railcar truck;

FIG. 2 is a transverse vertical section of the FIG. 1 suspension;

FIGS. 3, 4 and 5 are fragmentary vertical sections of modified forms of the FIG. 1 suspension;

FIG. 3A is a fragmentary side elevation of a portion of the side frame and adapter for the FIG. 1 railcar truck suspension;

Figure 6:
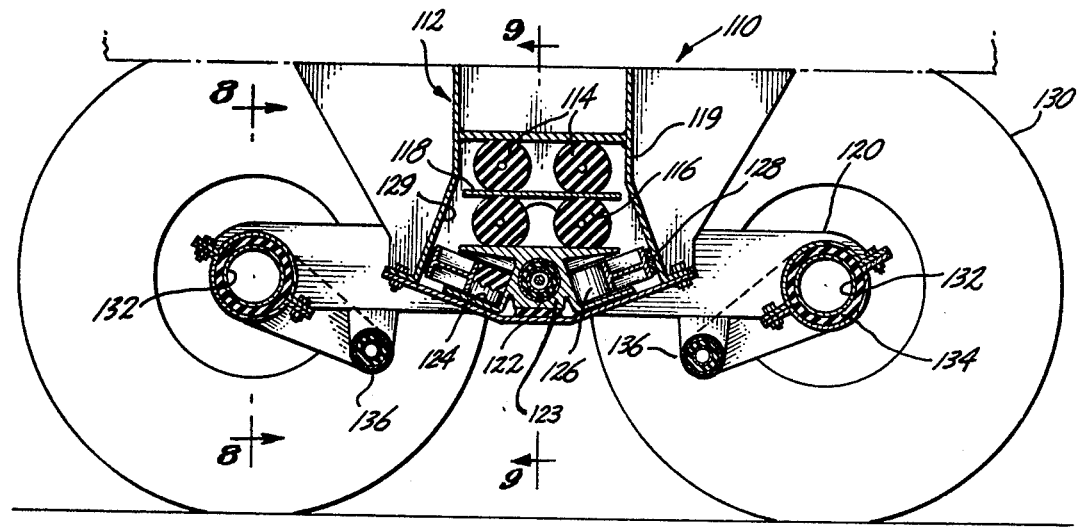
FIG. 6 is a longitudinal vertical section taken through a suspension system embodying the principals of the invention as applied to a double axle bogie of a tractor/trailer vehicle.
Figure 8:
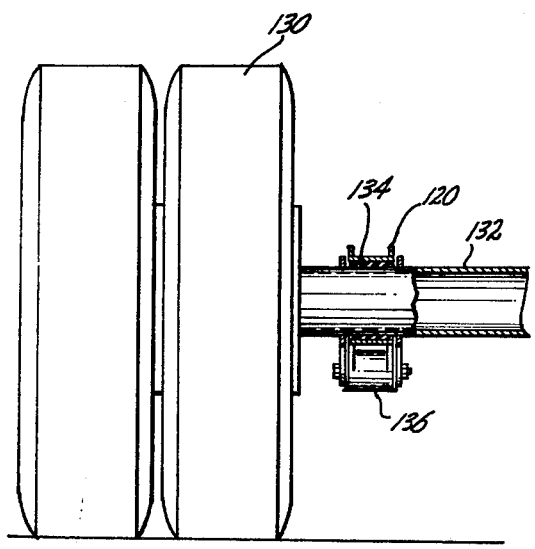
Figure 9:
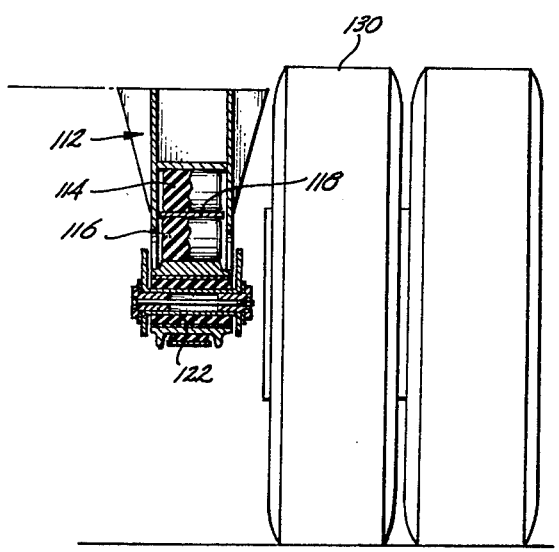
Figure 10:
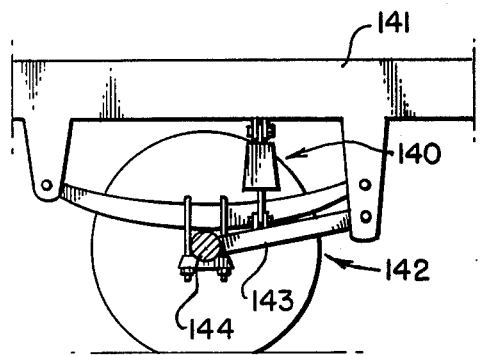
Figure 11:
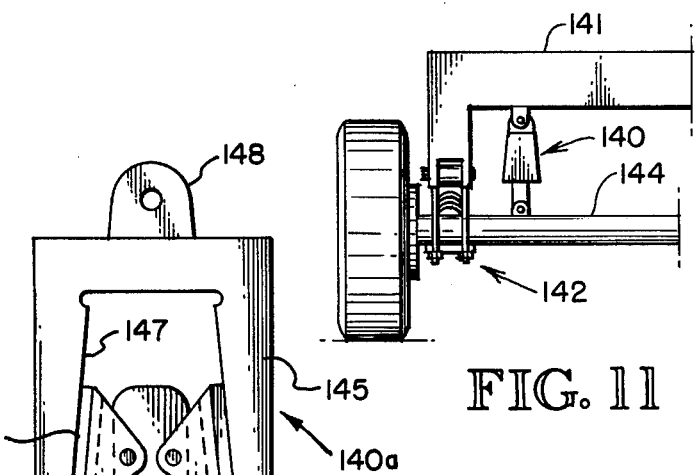
Figure 22:
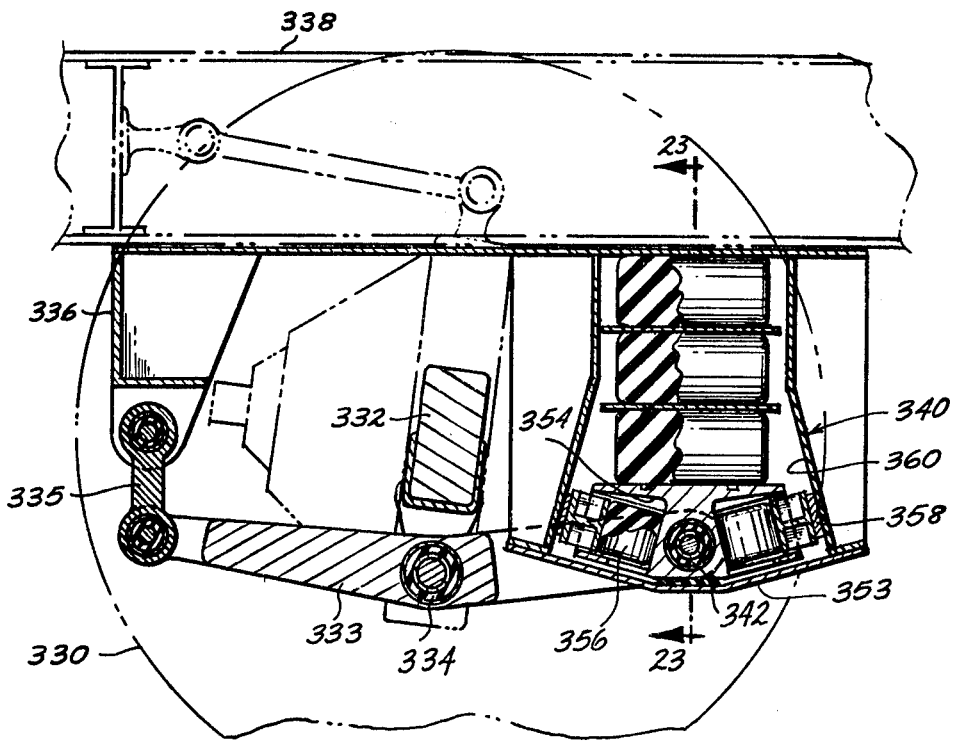
Figure 23:
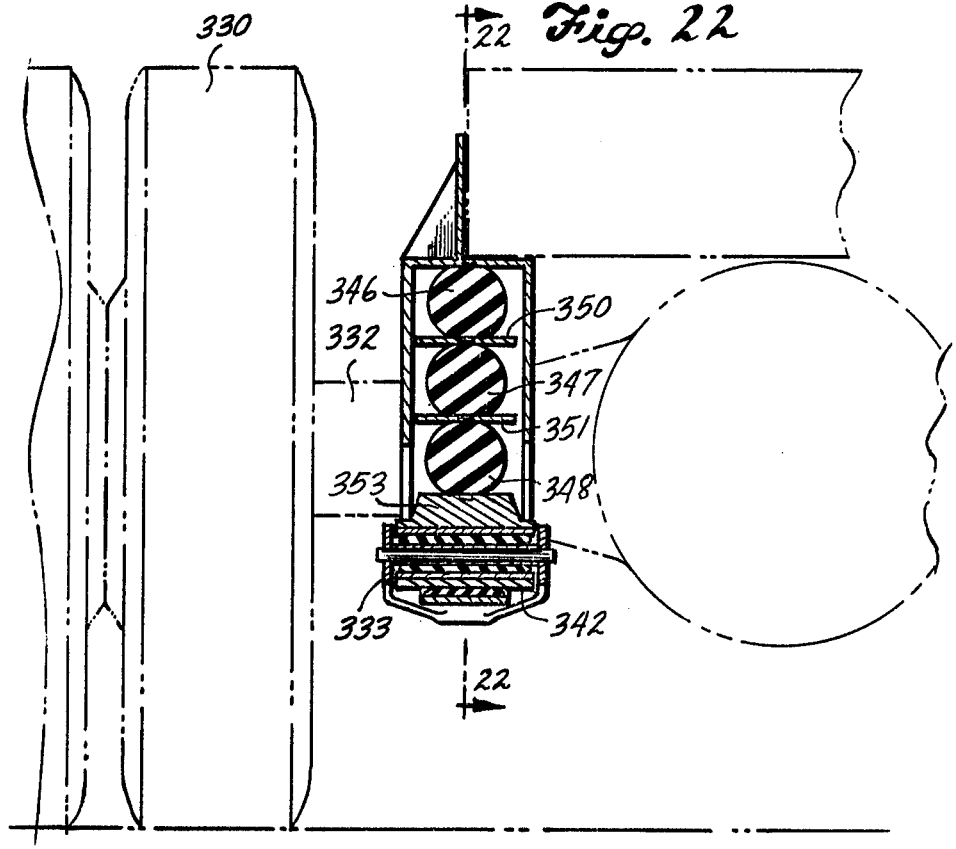
Figure 24:
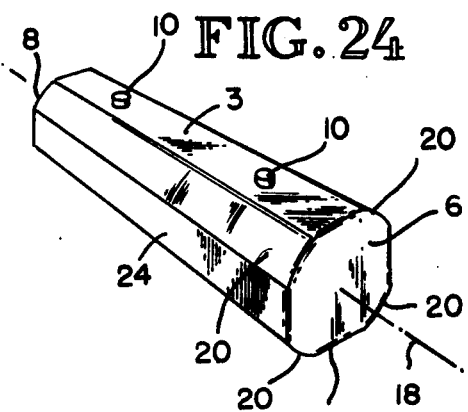
Figure 25:
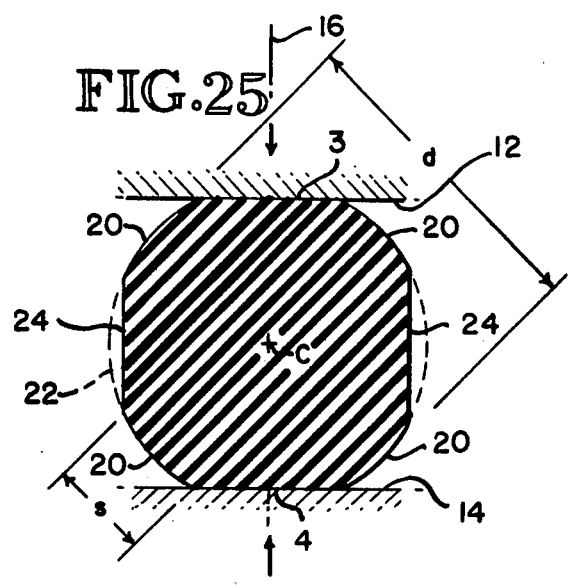
Figure 27:
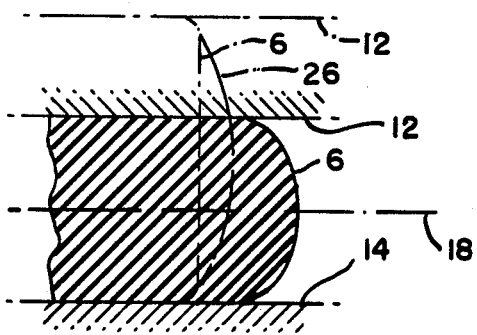
Figure 26:
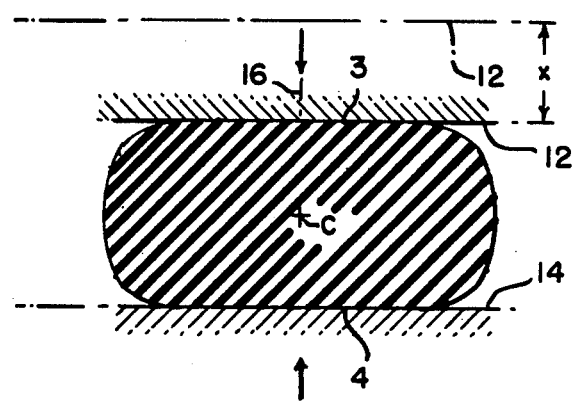
Figure 29:
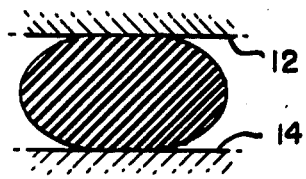
Figure 30:
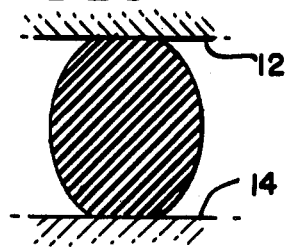
Figure 28:
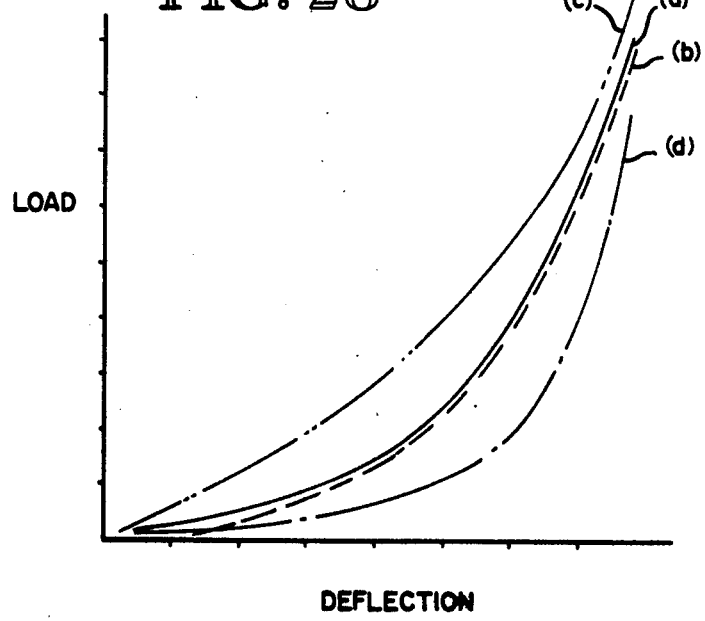
Figure 16:
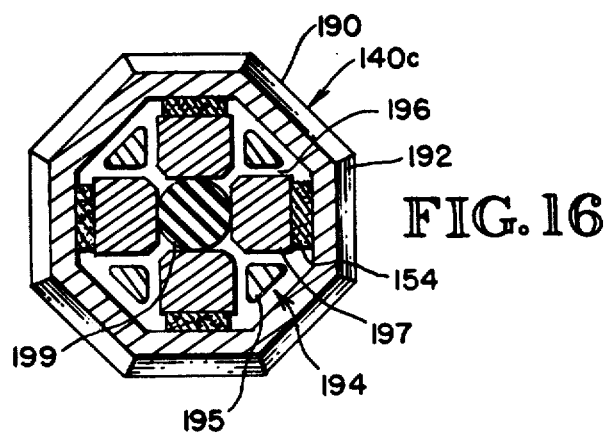
Figure 18:
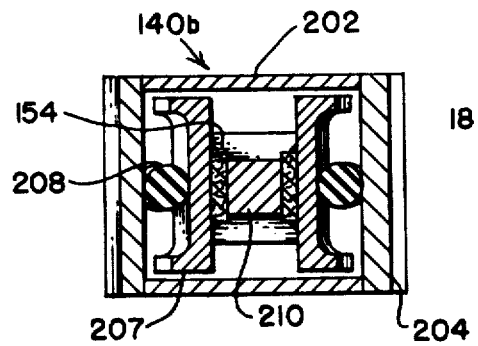
Figure 17:
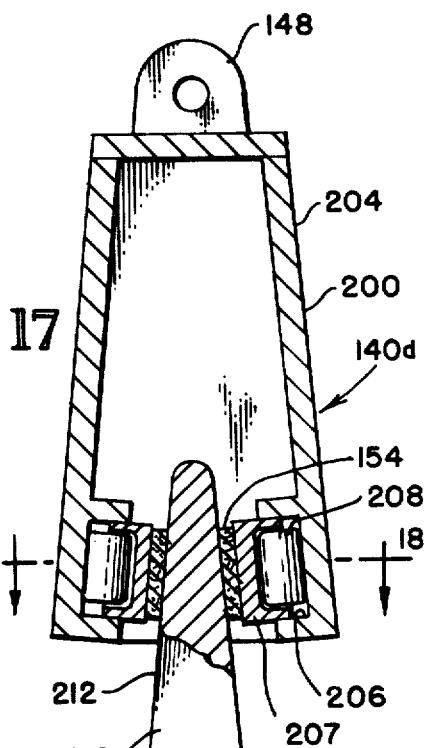
Figure 19:
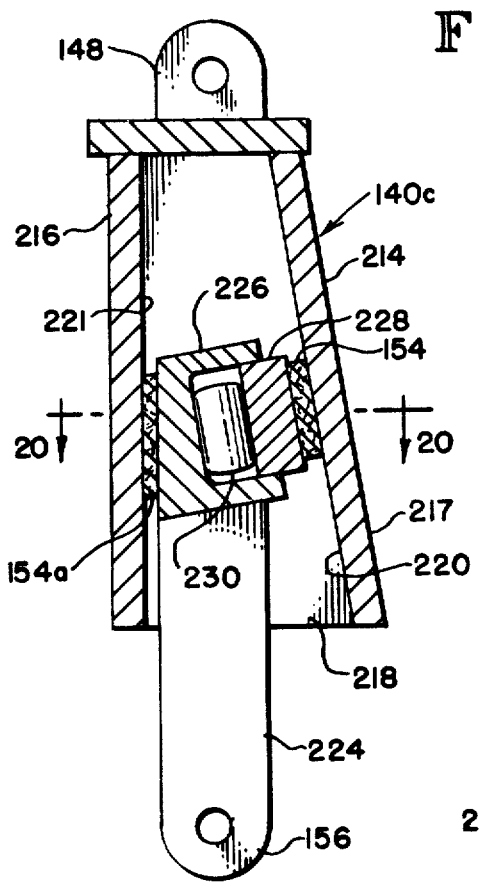
Figure 21:
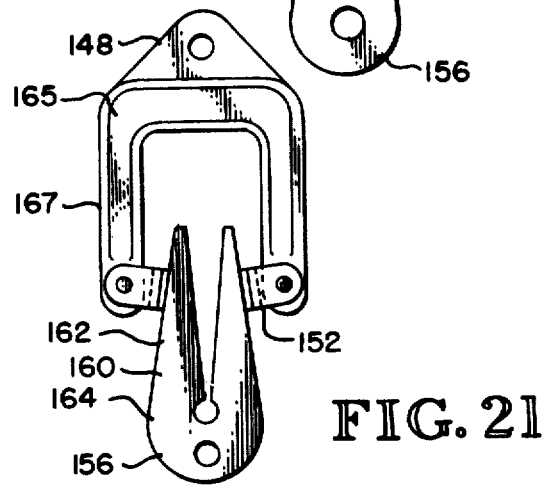
Figure 20:
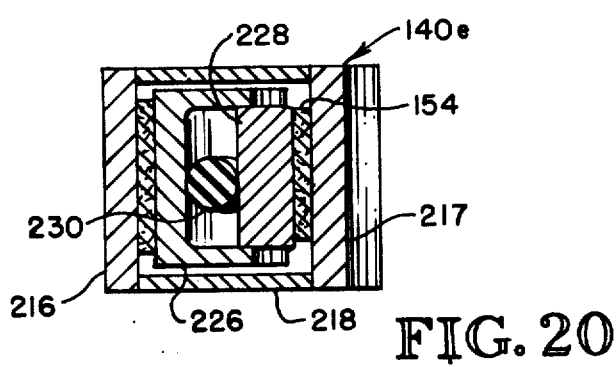
Figure 22:
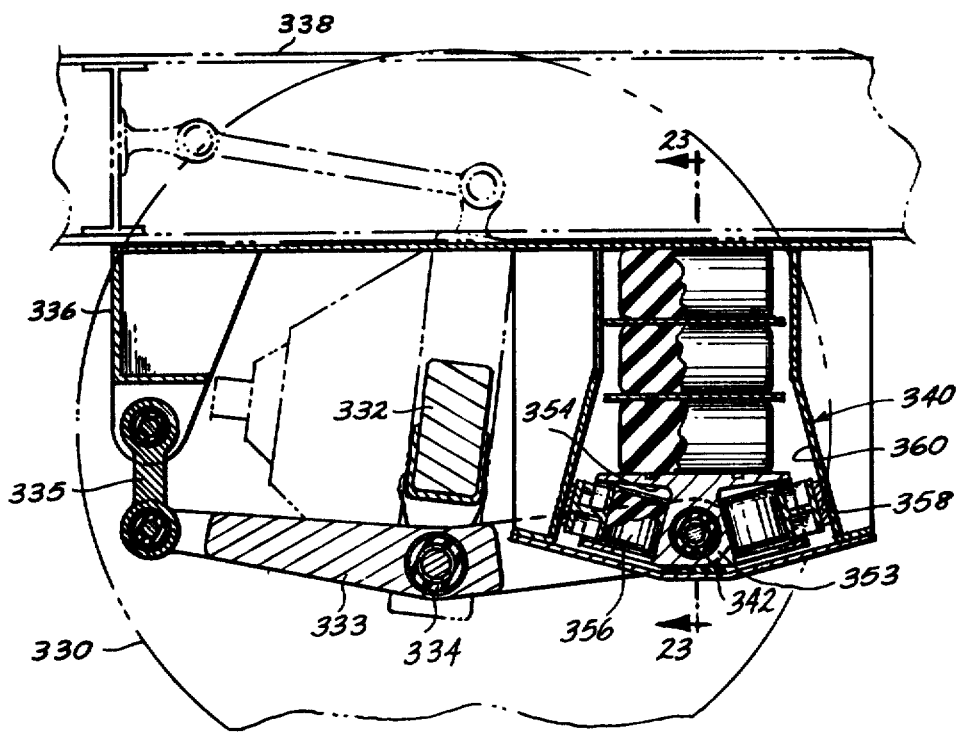
Figure 23:
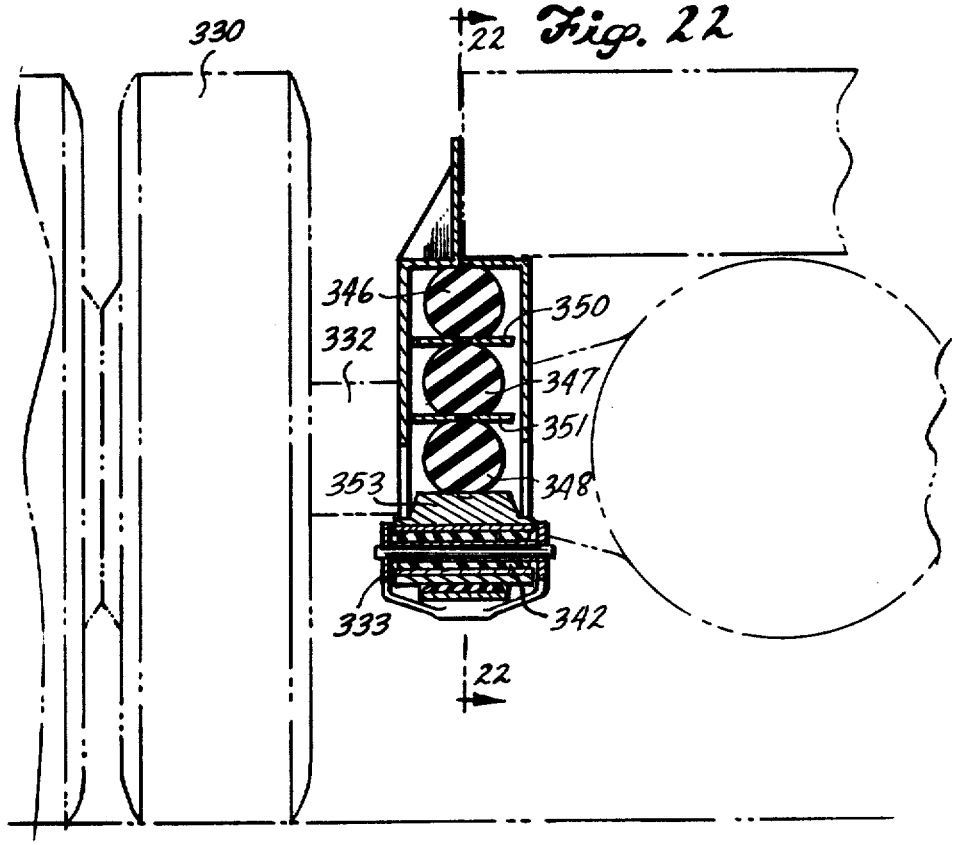

FIGS. 8 and 9 are sections taken along the lines 8—8 and 9—9 of FIG. 6;

FIGS. 10 and 11 are schematics depicting modified forms of the frictional damper of this invention;

FIGS. 12-21 are vertical elevations or sections of various forms of the damper of FIGS. 10 and 11 on expanded scale and in additional detail;

FIG. 22 is a longitudinal section of a second form of rubber tired vehicle suspension of this invention;

FIG. 23 is a transverse section taken along the lines 23—23 of FIG. 22;

FIG. 24 is a perspective of the rod spring of this invention;

FIG. 25 is a transverse section, depicting the rod spring of FIG. 24 in its unloaded condition;

FIG. 26 is generally similar to FIG. 25, depicting the rod spring of FIG. 24 in its loaded condition;

FIG. 27 is a fragmentary longitudinal section depicting the rod spring of FIG. 24 in broken and solid lines in its unloaded and loaded conditions, respectively;

FIG. 28 is a graph of a load versus deflection of the rod spring of FIG. 24 formed of various cross sectional configurations;

FIGS. 29 and 30 are generally similar to FIG. 25, depicting a modified cross sectional configuration and various loading orientations of a modified rod spring.

DETAILED DESCRIPTION OF THE DRAWINGS

The suspension system of this invention is illustrated and described herein in the environment of a railcar truck (FIGS. 1-5) or a rubber tired vehicle (FIGS. 6-23); however, other applications and uses of the suspension system of this invention will be apparent to one of ordinary skill in the art.

The suspension system includes a plurality of rod springs (designated 84, 85 and 86 in FIGS. 1 and 2; 84 and 100 in FIGS. 3 and 4; 101 in FIG. 5; 114 and 116 in FIGS. 6 and 9; and 346, 347 and 348 in FIGS. 22 and 23) as the main suspension spring elements. The illustrated suspension system further includes one or more friction dampers which preferably include rod springs (designated 96 in FIGS. 1 and 2; 126 in FIG. 6; 183 in FIGS. 13 and 14; 199 in FIGS. 15 and 16; 208 in FIGS. 17 and 18; 230 in FIGS. 19 and 20; and 356 in FIGS. 22 and 23) as the damper spring element.

Referring now in particular to FIGS. 24-30, each illustrated rod spring is made up of an elongated solid body of elastomeric material, preferably natural rubber or its equivalent, having a generally cylindrical cross sectional outline. Diametrically opposed upper and lower flats 3 and 4 extend in parallel planes substantially the entire length of the spring until merging with opposed end faces 6 and 8. To minimize or eliminate end stress concentrations, the peripheral edges of the end faces are rounded, as shown (FIG. 24). One or more generally cylindrical bosses 10 are upstanding from the upper and lower flats (lower bosses not shown). These bosses serve to locate and restrain rotational movement of the rod spring with respect to opposed load application surfaces between which the rod spring may be compressed, in a manner to be described presently. To prevent end stress concentrations, the bosses are spaced inwardly from the ends of the rod spring.

When loaded, the rod spring preferably is squeezed between parallel upper and lower load application surfaces 12 and 14, of generally planar configuration, as depicted in FIGS. 25-27. The faces of the upper and lower load application surfaces are parallel and respectively interface with, but are not bonded to, the upper and lower spring flats 3 and 4. In the examples of FIGS. 25-27, the load application surfaces are so positioned that when they are subjected to opposed vertical forces, indicated by arrows in FIGS. 25 and 26, directed along a force application axis, the rod spring is squeezed or compressed radially therebetween, without rotation, along a deflection axis 16 substantially perpendicular to the body longitudinal axis 18 and through its centroid C. (In the example of FIGS. 24-27, the centroid C coincides with the longitudinal axis 18). It will be understood, of course, that the direction of an applied load is not axial, that is, the rod spring is not loaded and thus does not function as an endloaded column. Furthermore, the rod spring is compressively loaded and hence does not function as a shear spring, nor as a combined shear-compression spring.

By virtue of the configuration, disposition and positioning of the load application surfaces of FIGS. 25-27, the interfacing portions of the load application surfaces 12 and 14 and spring flats 3 and 4 remain in continuous static interfacing engagement. That is, they are free of relative rotational, shifting or sliding movement during load application. Thus, as the rod spring is squeezed between the load application surfaces 12 and 14 in the manner described, its centroid C is moved along a line which substantially coincides at all times with the deflection axis 16. Further, the force vectors of the opposing compressive forces, indicated by arrows in FIGS. 25 and 26, substantially coincide at all times. Consequently, torsional forces or force couples which tend to twist of rotate the rod spring are eliminated or minimized, as are destructive shear stresses and surface wear of the elastomeric material which comprises the body.

In the unloaded condition, depicted in FIG. 25, the spring flats are disposed at spaced apart locations on the deflection axis 16 and constitute the spring load bearing surfaces; however, in the loaded condition, depicted in FIGS. 26 and 27, the spring flats are disposed at decreased spacing on the axis 16 and the spring load bearing surfaces are of increased area. This increased areas is provided by roll down of the upper and lower portions of the spring side and end surfaces into interfacing static contact with their respectively adjacent load appliction surfaces. More specifically, as illustrated in cross section in FIGS. 26 and 27, the rod spring includes four arcuate peripheral segments 20, respectively located adjacent the longitudinal edges of the upper and lower flats 3 and 4, which roll down laterally in response to an applied load. In their unloaded condition (FIG. 25), these segments approach and merge with their respectively associated flats at acute angles; however, when loaded (FIG. 26), they roll down freely until substantially coninciding with the faces of their respectively associated flats and thereby enter into interfacing static engagement with the load application surfaces 12 and 14. As depicted in FIG. 27, rounded portions of the spring ends roll down simultaneously with and in generally similar manner as the segments 20. Consequently, due to the free roll down of these spring side and end surfaces in response to an applied load, the resultant increased contact area obtained is free of destructive stress concentrations which commonly occur in bonded plate elastomeric springs in the vicinity of the rubber-plate interface or bond, or in conventional elastomeric shear compression springs. Additionally, the increased contact area obtained is free of corners, indentations or the like which tend to produce other destructive stress concentrations. Inasmuch as these portions of the spring side and end surfaces do not shift or slide relative to the load application surfaces during roll down, and thereafter remain in static interfacing engagement therewith, problems of surface wear, shear stress, force couples and torsional forces, such as are encountered in conventional roller-type and other prior elastomeric springs, are overcome or mitigated.

The cross sectional configuration of the rod spring provides a shape factor which varies in response to application of compressive loads along the deflection axis 16. The term "shape factor" as used herein may be defined as the ratio of the area of the spring load bearing surfaces to the area of the unloaded surfaces which are free to bulge in response to an applied load. In the unloaded condition, depicted in FIG. 25, the upper and lower flats constitute the load bearing surfaces, and hence the shape factor is small. When loaded, as depicted in FIGS. 25 and 26, portions of the spring side and end surfaces roll down to increase the area of the load bearing surfaces, as described previously. Consequently, the shape factor is correspondingly increased. As the shape factor increases, increasing compressive loads are required to attain a given deflection. That is, the spring becomes stiffer, or its resistance to further compression increases proportionally as its shape factor increases. Thus, it is possible, by forming the rod spring of a cross sectional configuration which provides a load variable shape factor, to obtain a rod spring having a non-linear or variable rate load-deflection curve. The preferred cross sectional configuration is symmetrical relative to the load application axis and most preferably is generally cylindrical.

FIG. 28 depicts typical load-deflection spring curves for the rod spring of this invention formed of various cross sectional configurations. These curves may be determined experimentally, or by calculation using known formulae for compression of rubber spring bodies. Curve (a) depicts the load-deflection curve of the rod spring of substantially cylindrical cross sectional configuration generally similar to that indicated by broken lines 22 in FIG. 25. The lower generally horizontal portion of the curve represents a low shape factor produced by substantially line contact between the spring load bearing and load application surfaces. The steeper, generally vertical portion of the curve depicts a higher shape factor in which the sides and ends of the rod spring have rolled down to thereby increase the load bearing contact surfaces thereof. Curve (b) represents the load-deflection curve of a rod spring formed with diametrically opposed upper and lower flats such as those shown in FIG. 24. These flats serve to preload or stiffen the spring during initial deflections, and hence the lower portion of the curve (b) is offset from the corresponding portion of curve (a). As will be appreciated from FIG. 28, curve (b) is somewhat steeper than curve (a) for light loads; however, the two curves (a) and (b) substantially coincide at higher loads. Curves (c) and (d) depict the load-deflection curves of rod springs of generally eliptical cross sectional configuration which are loaded such that the force application axis substantially coincides with their minor and major axes, respectively, as illustrated in FIGS. 29 and 30. Inasmuch as the rod spring of FIG. 29 has a higher shape factor than that of the rod spring of FIG. 30 for most applied loads in the lower to mid-range, the lower portion of curve (c) is steeper than that portion of curve (d); however, at higher loads in which each spring is squeezed further, curves (c) and (d) are of generally similar steepness.

Thus, it is possible, by varying the cross sectional configuration of the rod spring to control the load-deflection spring curve obtained. It will be recognized that other cross sectional configurations may be used and that the configurations illustrated and described herein are not considered as limiting. It is possible, of course, to control the spring curve obtained by modifying the area and/or configuration of the flats 3 and 4. Additionally, the spring curve obtained may be controlled by using elastomeric material of varying hardness.

The rod spring of this invention may be compressed as described herein to obtain substantial deflections, without overstressing, or appreciable compression set, or cold flow of the elastomeric material used, under both intermittant and repeated loading conditions. Preferably, for a rod spring having the flattened cross sectional configuration illustrated, percentage deflection, or the percentage ratio of deflection (x) to diameter (d) (See FIGS. 26 and 25, respectively), is about 30% to 50%; however, a generally similar rod spring has been tested successfully at substantially higher percentage deflections.

To reduce the size and weight of the rod spring without affecting the spring curve obtained, parallel diametrically opposed relief surfaces 24 may be formed by lateral relief cuts in the body of elastomeric material between the upper and lower flats, as shown (FIGS. 24 and 25). The depth of these relief cuts, and hence the amount of rubber removed, is dependent upon the amount of roll down of the spring sides. These cuts must leave the arcuate segments 20 of sufficient length S (FIG. 25) to roll down under maximum load and deflection. As illustrated in FIGS. 24 and 27, the ends of the rod spring also are relieved to reduce the size and weight and to enable the rod spring to be positioned in a confined space. The ends, of course, may be of generally spherical end configuration, as depicted in broken lines 26 in FIG. 27, to further minimize or eliminate end stresses.

Although the illustrated rod spring is made up of a solid body of elastomeric material, it could include appropriate cavities, holes, etc. to aid in fabrication, as well as to provide air circulation for heat dissipation. The construction and arrangement of such cavities, holes, etc., of course, should be selected to maintain the above-mentioned operation of the rod spring.

The rod spring of this invention is particularly suitable for use in vehicular suspension systems for railcars or rubber tired vehicles. In such applications, several springs may be arranged to combine their spring forces in series (i.e., between a plurality of load application surfaces; e.g. see FIG. 1 — three tiers designated 84, 85 and 86) or in parallel (i.e., between common load application surfaces; e.g. see FIG. 1 — intermediate tier designated 85) with their longitudinal axes parallel, perpendicular or askew to one another. Thus, it will be understood that the suspension system spring curve obtained may be controlled by controlling the spring curves of the individual rod springs, as described previously, and additionally by controlling their numbers, orientations, arrangements, etc.

One embodiment of the suspension system for use in a railcar truck is illustrated in FIGS. 1 and 2. The truck includes a truck side frame 40 having a suspension housing 82. Centrally positioned in the housing is a wheel axle 2 having a conventional roller bearing 5 and a wheel 1. Within the housing is a vertical stack of spring elements designated as 84, 85 and 86 each generally similar to the rod spring of FIGS. 24–30. The top spring element 84 abuts against the top surface of the suspension housing and lies on a horizontal spacer plate 87. The center axis of the spring element 84 lies in a longitudinal direction. The upper and lower surfaces of the spring element are provided with flats 84a. The second tier of spring elements 85 is also provided with flats 85a at top and bottom and includes three such elements, one centered over the axle 2 and the others spaced equidistantly on either side of the axle. The spring elements abut against the spacer plate 84 and a second lower spacer plate 88. Finally, the lowermost spring elements 86 are two in number transversely located and equidistantly spaced on either side of the axle. The elements 86 are also provided with upper and lower flats 86a and abut against the lower spacer plate 88 and a spacer plate 90. The spacer plate 90 is bonded to an elastomer pad 91 which mainly provides lateral shear spring return motion for the truck and railcar between the wheels and sideframe. The spring pad 91 is carried on a sub housing carrier or adapter 93 which is mounted on the bearing 5. A bumper or stop 94 may be provided for limiting downward movement of the housing 82 to prevent over-compression of the spring elements 86. It will be understood, of course, that the suspension housing 82 and plates 87, 88 and 90 provide sets of opposed substantially flat load application surfaces which correspond to surfaces 12 and 14 of FIGS. 24–30.

The springs 86 (lowest tier) may be designed to be the stiffest springs with the intermediate and upper springs 85 and 84 being softer. With this construction, the suspension may be precompressed to the initial limit of the three inch travel allowed within the coupler vertical limits (preferably precompressed about 3 inches) and thus provides good spring effect even in the unloaded condition of the vehicle. The relative sizes and shapes of the rod springs, of course, may vary depending on the application and the shape factor selected. In a preferred embodiment of the invention shown in FIGS. 3 and 4, the intermediate springs 85 are replaced by a single rod spring 100 which is arranged in parallel alignment with spring 84. Each of the springs 84 and 100 has a generally cylindrical shape and again is softer than the lower springs 86. These lower springs, although stiffer than the upper two layers, provide, to a large extent, the soft portion of the spring rate in the suspension system. Compression with light lading in the car will allow the springs 86 to absorb some of the loads, but for most loads and all heavy lading, the upper spring elements come into play. It should be understood that the size, stiffness, number and arrangement of the springs is dependent upon the load capacity and type of application required, therefore the examples are to be considered as illustrative only.

Although there is inherently in the rod springs a certain amount of internal damping, dependent upon the elastomeric material used, it is insufficient to provide total damping necessary for most conditions experienced by vehicles. As an example, a rubber having approximately 15% internal damping in the embodiment illustrated may amount to less than 8% of critical (effective) damping for the total system for an application which may require as much as 20% of critical damping. The additional required damping is obtained from a unique variable rate damping system again best illustrated in FIGS. 1 and 2 of the drawings.

The variable damping system of this invention produces a damping force which varies with vertical distance on a varying exponential curve which is designed to closely match that of the main suspension rod springs and add cumulatively to their inherent damping. The varying exponential spring and damping rate provides a slowly changing rate under low loads and a rapidly increasing rate in the upper load range. The system of FIGS. 1 and 2 includes two friction dampers which also provide load responsive lateral damping for the lateral pad springs where used. For this purpose, a horizontal lateral gap of about one-fourth inch is provided on either side of the friction shoe 98 to allow lateral movement.

As is also readily apparent the illustrated symmetric spacing of the dampers balance the damping and springing moments on either side of the axle 2 thus reducing undesirable moments and tending to center the carrier at all times.

In the damping system of FIG. 1, each damper includes a rod spring 96 arranged in a cylinder 95, the two cylinders 95 being spaced equidistantly from and on each side of the rotatable axis (FIG. 1, the vehicle axle). A friction shoe element 98, of a conventional brake shoe type material, is pushed by a rectangular piston 99, which abuts against the side of spring element 96, against a sloped surface 46, which latter is parallel to the face of element 98. It can thus be readily recognized that lowering the housing 82 due to increased loads or dynamic forces acting on the car will move the sloped surface 46 downwardly, sliding it past the friction show 98 and compressing the rod spring 96 as described above. The greater the downward movement, the greater the outward force provided by the spring element 96 on the friction shoe thus increasing the damping force applied through the system. It is, of course, understood that the angle of the sloped surface and/or the stiffness of the rod spring 96 can be varied to control the damping force obtained, and that carrier 93 and piston 99 provide load application surfaces generally similar to surfaces 12 and 14 of FIGS. 24–30.

Vertical guidance of the carrier 93 to prevent fore and aft movement of the wheels relative to the side frame is provided first by the friction shoes 98 and under more severe loading by replacement steel wear plates 97 or their mountings 97' secured to fore and aft surfaces of the adapter for engagement in the axle slot 99 of the side frame 40.

Preferably, the damping force provided by the FIG. 1 system is directly related to the spring force provided by the spring elements 84, 100, 86 (FIGS. 3 and 4) such that with spring and damping forces increase at approximately the same rate under loading dynamic or static. Thus, where loads are high, the spring force is high and the damping force is high which is a desirable situation. When the loads are light, the spring force is low and the damping force is low, thus cushioning the shock to fragile light lading such as fruit in a refrigerator car.

In some instances, it is desirable to provide additional stability to the cylindrical spring elements, particularly when the generally cylindrical elements shown in FIGS. 1 and 2 are not stacked in vertical alignment with one another. For this purpose the modifications shown in FIGS. 3 and 4 are provided with bosses 100a that locate in recesses 100b of the plates 87 and 88. The bosses seated in the recesses provide locating and stability functions as well as allow ease of assembly and movement of the stacked springs to or from the housing 82. The bosses are spaced in from the longitudinal ends of the plates to minimize stress concentration at the ends of the elastomers.

In FIG. 5 still additional spring elements 101 of a different arrangement are shown. In this embodiment, the flats are provided with recesses 101a. The shape of the spring element is a balance between the amount of rubber removed at top and bottom to provide economy of material plus proficiency of performance. The recess type spring (still generally cylindrical) has basically the same volume as the more generally cylindrical spring. The shape of the curve of this modified form in cross sectional quadrant is approximately the same as for 84 and 100. The shape in all modified forms is quite important since too great a change from the generally cylindrical configuration changes the spring characteristics too severely to achieve the desired results.

While the forms illustrated provide the best configurations, they are not to be considered as limiting. Furthermore, various flats can be added to assure a better bond (if required) to the spacer plates and the ends of the generally cylindrical elements can be relieved to prevent high stress concentrations provided they are not changed too drastically to preclude their meeting the requirements of shape factor, size, spring travel, and desired variable spring rates necessary to a fully operative suspension system.

Figure 7:
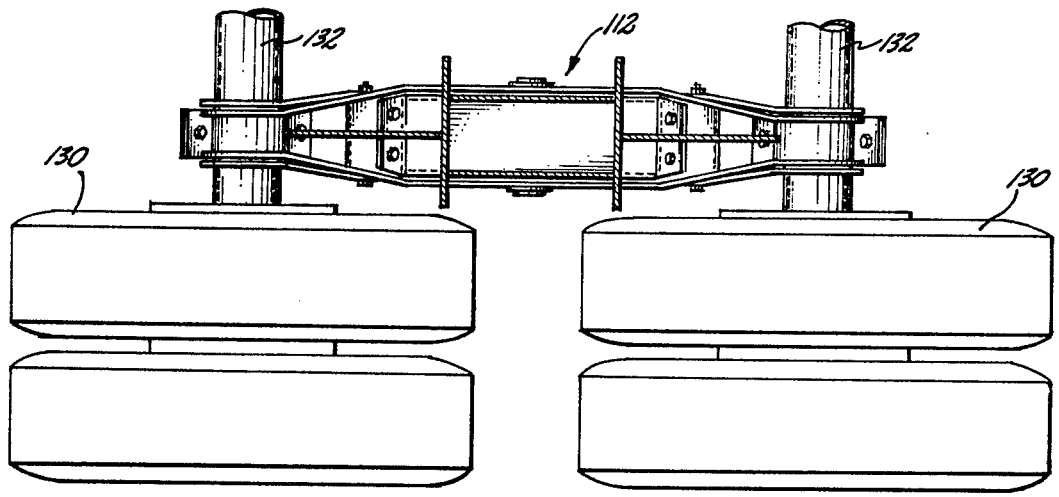
FIG. 7 is a fragmentary plan of the FIG. 6 suspension.

In addition and as best shown in FIGS. 3-5, the configuration or arrangement of the spring elements in the spring housing can also be varied. For example, in FIGS. 1 and 2, three cylindrical spring elements 85 are arranged with their longitudinal axes the same as the longitudinal axis of the axle 2. In FIG. 7, a special application for a tractor trailer suspension, the number of generally cylindrical spring elements is reduced because of lower load requirements.

FIGS. 6, 7 and 8 illustrate a typical suspension system for a double axle tractor trailer bogie 110. A suspension housing 112 is provided on the bogie and houses a plurality of upper spring elements 114 and two lower spring elements 116. The upper spring elements abut against the upper surface of the housing 112 and against a central spacer plate 118. The lower spring elements 116 abut against the central spacer plate 118 and against the upper surface 129 of a damping sub-housing or carrier 119. Alternatively the configuration and longitudinal direction of springs 114 and 116 could be similar to those shown in FIGS. 3, 4 and 5. As is well understood with this type of bogie system a walking beam 120 is pivotally mounted within the sub-housing by an elastomer bushing 122.

As in the embodiment illustrated for the railcar the damping sub-housing 119 is provided with a carrier 123 that rides on bushing 122 and seats cylinders 124 that house spring elements 126 and friction shoes 128. The friction shoe rides against the damping surface 129 that is angled such that increase in downward movement of the surface 129 increases the friction between the shoe 128 and the surface 129 thus providing a damping system variable directly proportional to the load applied. The system functions much as in the railcar with the shock absorbed by the wheels 130 on the axles 132 being passed through bushings 134 to the walking beam 120 and thus to the suspension system. Conventional torque members 136 are provided as is standard on double axle bogies.

The area illustrated by 97' in FIG. 3A may be a removable portion or wear element in the case where such appears advisable to allow replacement of only the heavily wearing parts of the subhousing.

It should be understood that any of the cylindrical elements, including those with stabilizing bosses or recesses, flats, etc., can be used in the road vehicle suspension as well as for railcar use. Furthermore, the rubber tire vehicles suspension includes use on tractors as well as trailers or other vehicles.

As best shown in FIGS. 10 and 11, an independent friction damping apparatus 140 is pivotally coupled at each end between a vehicle body 141 and the running gear 142 of the vehicle. In FIG. 10 the apparatus is coupled at its lower end to a pivot bar 143 coupled to the axle 144 whereas in FIG. 11 the friction damping apparatus 140 is coupled directly to the axle 144. The pivotal connection allows relative horizontal movement between the vehicle body and the running gear.

The variable rate friction damping apparatus 140 may take various forms, as illustrated in the accompanying figures of the drawing, but basically includes sloped first means for varying the rate of force dependent on distance moved, frictional second means engageable with said first means for providing damping, means for biasing the frictional second means and sloped first means against each other, and means for pivotally mounting the first and second means between the vehicle body and the wheel suspension. The first means preferably is a smooth surface. Either the upper or the lower member in the damping apparatus can be the sloped surface and vice versa. Likewise the sloped surface can be inwardly facing or outwardly facing. Generally an elastomeric spring is employed for biasing the friction member against the sloped surface, but as shown in FIGS. 12 and 21 the elasticity of the sloped means or alternatively of the friction member can be employed for springing.

Figure 12:
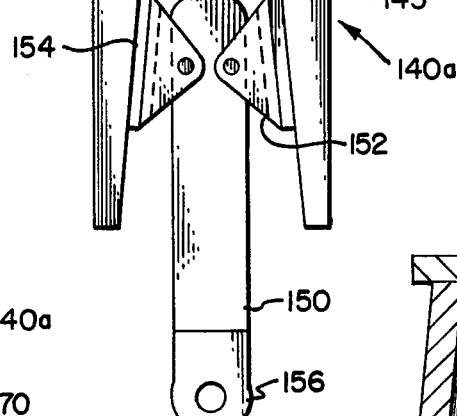

One embodiment 140a of the invention is illustrated in FIG. 12. This embodiment has a body or linkage 145 which includes two spaced elastically deflectable legs 146. The legs are made of high strength steel which would not be stressed beyond its elastic limit in use such that legs in effect are springs. The legs are provided with outwardly converging opposed sloped surfaces 147. A pivot connection 148 is provided at one end of the body remote from the sloped surfaces for coupling the body either to the vehicle body or the running gear of the vehicle. Fitted within the legs 146 is an arm 150 having two sets of pivotally mounted friction elements 152, each having a conventional friction type pad material 154. A pivot connection 156 is provided at the opposite end of the arm for coupling either to the vehicle opposite end of the arm for coupling either to the vehicle running gear or the vehicle body. In operation, the dynamic loading of the vehicle body will move the linkage 145 relative to the arm 150. With increases in loading the friction damping force will increase since the friction pads will move into the narrower space between the sloped surfaces, thus increasing the spring force acting on the friction pads.

Figure 21:
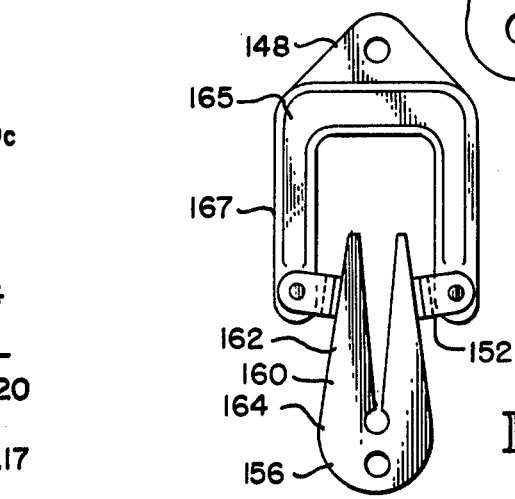

A somewhat opposite configuration is illustrated in FIG. 21 in which an arm 160 is provided with two elastically deflectable legs 162, each of which has a sloped outer surface 164. That is, the width of the arm 162 between the sloped surfaces 164 increases in a direction downwardly, as viewed in FIG. 21 but the width could decrease in the alternative. A linkage or body is provided with spaced relatively inelastic or rigid arms 167 which pivotally mount friction shoes 152 as in FIG. 12. Relative movement between the arm and the linkage in FIG. 21 will cause increasing friction damping as the arm is moved toward the linkage and vice versa.

Figure 13:
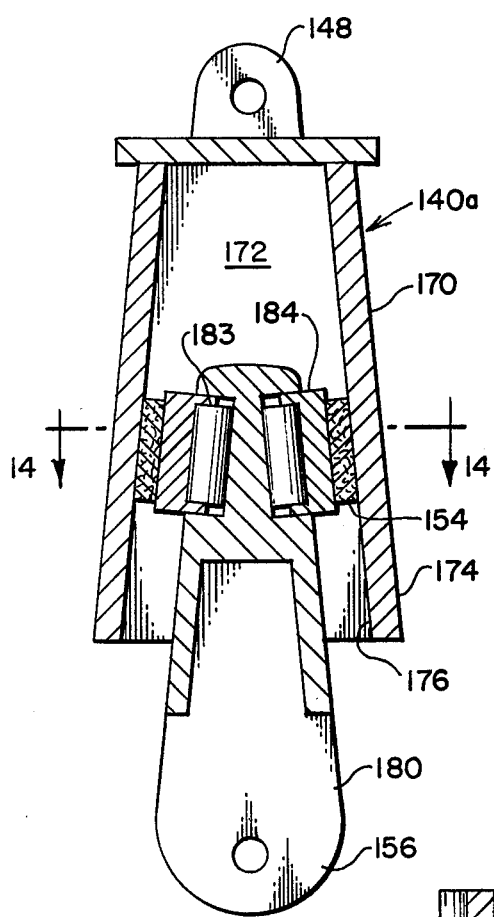
Figure 14:
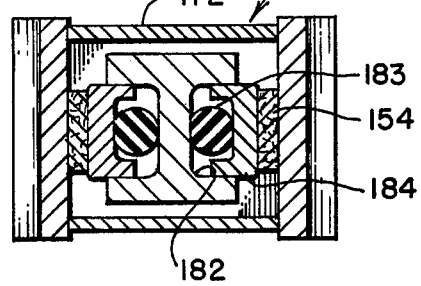

The embodiment of FIGS. 13 and 14 has a body or linkage 170 having spaced parallel side walls 172 and spaced outwardly diverging sloped walls 174. The sloped walls 174 have smooth surfaces 176. An arm 180 is provided with recesses 182, each of which houses an elastomeric rod spring 183, a sliding piston 184 and a friction shoe 154. Elastomeric spherical or one-half cylindrical springs can also be used. The rod springs are made of the same material as the spring elements 126 described earlier. In this embodiment relative longitudinal movement between the body 170 and the arm 180 causes an increasing damping force with increasing distance or load as earlier described.

Figure 15:
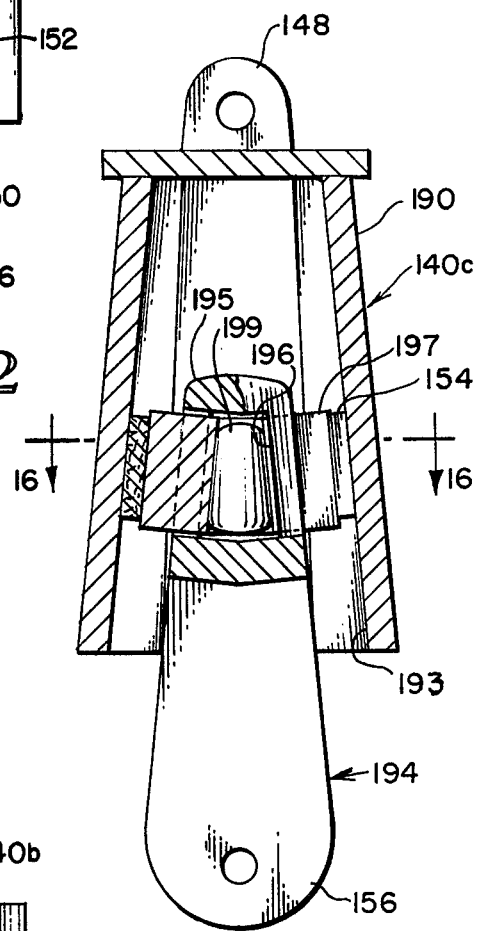
Figure 16:
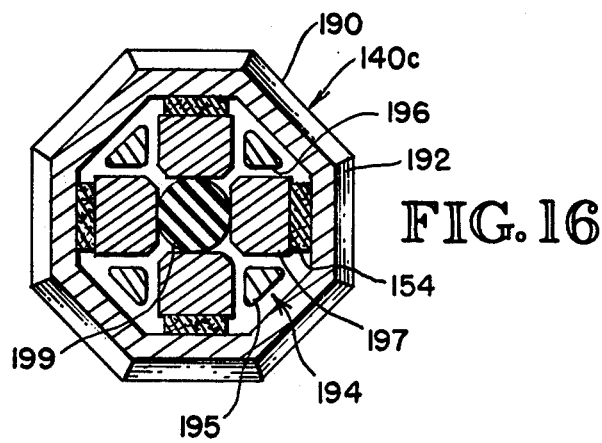

The embodiment of FIGS. 15 and 16 illustrates a body 190 having octagonal side walls 192. These side walls diverge downwardly and are provided with slope surfaces 193 (FIG. 15). An arm 194 has a bracket 195 integrally formed on an end thereof. The bracket provides four circumferentially spaced openings 196 that house pistons 197. Friction material pads 154 are provided on the outwardly facing surfaces of the pistons 197. The pistons slide in the openings 196 and are all simultaneously equally biased by an elastomeric rod spring 199. As is readily apparent, relative longitudinal movement between the arm and the body will cause friction damping along the sloped surfaces of four of the octagonal walls.

Figure 17:
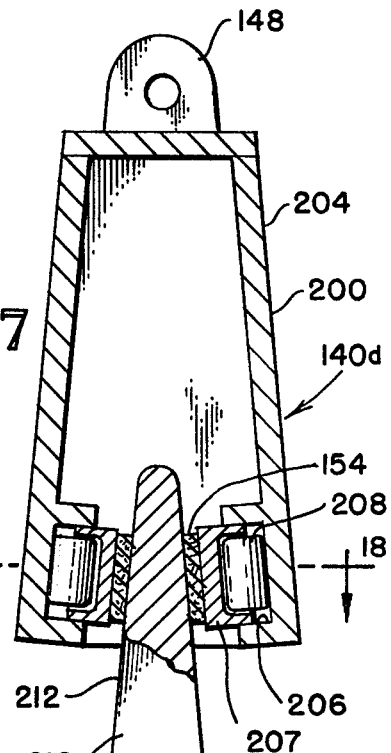
Figure 18:
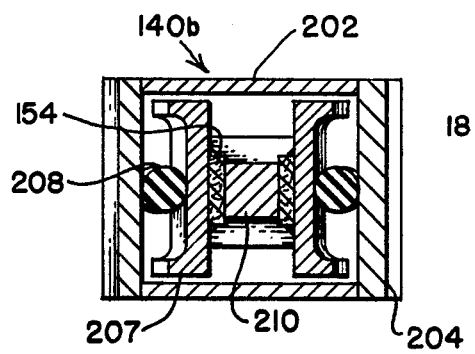

FIGS. 17 and 18 illustrate an embodiment in which a body or linkage 200 has parallel side walls 202 and sloped sidewalls 204. The sloped side walls have recesses 206 in confronting relation. Housed in each recess is a piston 207 which is provided with a friction material pad 154. An elastomeric rod spring 208 urges each piston toward the longitudinal center line of the body. An arm 210 is provided with inwardly converging smooth outer surfaces 212 that slide against the friction material pad 154. As is readily apparent, longitudinal relative movement between the arm 210 and the body 200 cause variable friction damping as before described.

Figure 19:
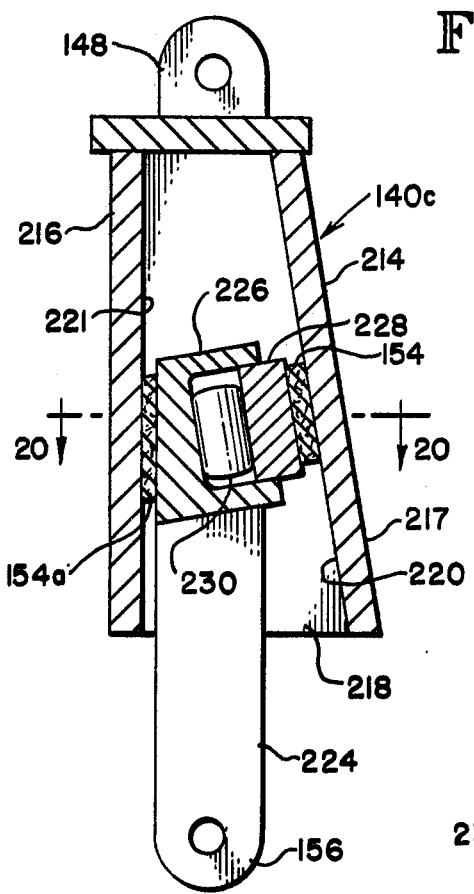
Figure 20:
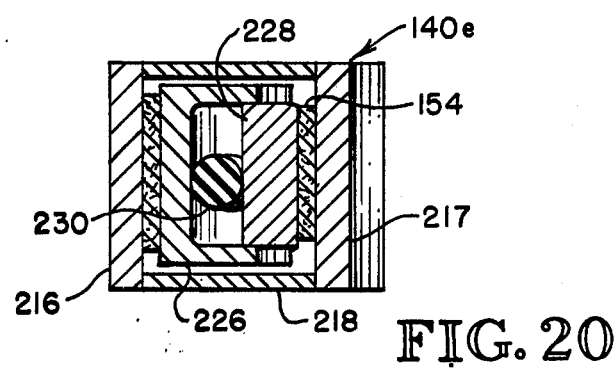

FIGS. 19 and 20 show still another embodiment in which a body or linkage 214 is provided with a straight sidewall 216, a sloped side wall 217 and a pair of parallel spaced sidewalls 218. The sloped and straight sidewalls 217 and 216 respectively are provided with smooth inner surfaces 220 and 221, respectively. An arm 224 is provided with an integral bracket 226 that houses a piston 228 having a friction material pad 154. The piston is urged outwardly by an elastomeric rod spring 230. A second function material pad 154 is fastened directly to the opposite side of the arm. As is readily apparent, logitudinal relative movement between the body 214 and the arm 224 will provide variable friction damping between the two friction pads and the surfaces 221 and 220.

FIGS. 22 and 23 illustrate a form of suspension system for the single axles of a rubber tire vehicle. In this suspension wheels 330 are carried by an axle 332. The axle is pivotally secured to a beam 333 through a conventional rubber bushing 334. One end of the beam is pivotally coupled by a rubber bushing supported shackle 335 to a shackle bracket 336 which is fixed to a longitudinal side frame rail 338 of the vehicle. The opposite end of the beam is pivotally mounted to a suspension housing 340 by a bushing 342. The suspension housing 340 is basically the same as suspension housing 112 of FIGS. 6–9.

The suspension housing 340 includes three elastomeric rod springs 346, 347 and 348 spaced by upper and lower spacer plates 350 and 351, respectively. A carrier 353 rides on the bushing 342 and provides cylinders 354. The cylinders hold elastomeric damping springs 356 and pistons which have friction shoes 358 as in the earlier embodiments to engage sloped side plates 360.

As is readily understood dynamic loading of the vehicle 338 will load the springs 346–348 and provide damping through side plates 360 and shoes 358 in much the same manner as in the embodiment of FIGS. 6-9.

As in the earlier described embodiments the damping and springing forces are symetrically resolved around the central axis of the bushing 342. It should be understood that in vehicles having sufficient space between the body frame and the wheel axle, the suspension can be placed directly over the sheel axle as in the railcar application.

Other modifications employing the same basic concept will, of course, be apparent to one skilled in the art. The invention is therefor not to be limited to the specific embodiments shown.

While the preferred embodiments of the invention have been illustrated and described, it should be understood that variations will be apparent to one skilled in the art. Accordingly, the invention is not to be limited to the specific embodiments illustrated.

The embodiments of the invention in which an exclusive property or privelge is claimed are defined as follows:

1. A rubber tired vehicle suspension for transmitting a load between an axle and a body of a rubber tired vehicle, which suspension comprises load bearing spring means comprising at least one resilient rod spring composed of an elongated body of elastomeric material having an elliptical cross-section and opposed elongated longitudinal load bearing surfaces; and mounting means for attachment between the body and axle of a rubber tired vehicle, said mounting means carrying said rod spring in a position such that load bearing compressive forces only are transmitted to said load bearing surfaces transversely of the rod spring longitudinal axis with respect to said mounting means, while simultaneously therewith permitting the unloaded rod spring surfaces to bulge freely.

2. The suspension of claim 1, further comprising damping means operatively associated with said rod spring and said mounting means for producing a damping force simultaneously with said spring force.

3. The suspension of claim 1, wherein said damping means includes at least one friction surface, and a friction damping member slidably engaging said friction surface and operatively associated with said rod spring such that it will engage said friction surface with increasing force as a result of an increasing load bearing force being transmitted to said rod spring.

* * * * *

UNITED STATES PATENT AND TRADEMARK OFFICE
CERTIFICATE OF CORRECTION

PATENT NO. : 4,109,934

DATED : August 29, 1978

INVENTOR(S) : Hamilton Neil King Paton, John B. Skilling and Frank F. Smith

It is certified that error appears in the above-identified patent and that said Letters Patent are hereby corrected as shown below:

In the drawings, Fig. 12, insert --146-- and reference lines to the two deflectable legs;

Fig. 16, shorten the reference line from numeral 196 such that it indicates the circumferentially spaced opening;

Fig. 22, extend the reference line from numeral 353 to the carrier;

Fig. 23, extend the reference line from numeral 342 to the conventional rubber bushing.

Column 6, line 41, change "of" to --or--; line 50 change "This increased areas is" to --These increased areas are--; line 51, change "Figs. 26 and 27 to --Figs. 24 and 25--.

Column 7, line 28, change "Figs. 25 and 26" to --Figs. 26 and 27--

Column 8, line 27, change "intermittant" to --intermittent--.

UNITED STATES PATENT AND TRADEMARK OFFICE
CERTIFICATE OF CORRECTION

PATENT NO. : 4,109,934

DATED : August 29, 1978

INVENTOR(S) : Hamilton Neil King Paton, John B. Skilling and Frank F. Smith

It is certified that error appears in the above-identified patent and that said Letters Patent are hereby corrected as shown below:

Column 10, line 25, insert a comma (,) following "apparent"; line 41, change "show" to --shoe--; line 62, change "with" to --both--.

Column 11, line 55, delete "129" and delete "or"; line 56, change "119" to --123--

Column 13, line 63, change "function" to --friction-- and "154" to --154a--.

Column 14, line 28, change "sheel" to --wheel--.

Signed and Sealed this

Ninth Day of October 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,109,934

DATED : August 29, 1978

INVENTOR(S) : Hamilton Neil King Paton, et al

It is certified that error appears in the above—identified patent and that said Letters Patent is hereby corrected as shown below:

Sheets 3, 4 and 5 of the drawings should be deleted to insert the attached sheets of drawings respectively therefor.

Column 6, line 41, change "of" to --or--;
         line 50, change "This increased areas is" to --These increased areas are--;
         line 55, change "Figs. 26 and 27 to --Figs. 24 and 25--

Column 7, line 28, change "Figs. 25 and 26" to --Figs. 26 and 27--.

Column 8, line 27, change "intermittant" to --intermittent--.

Column 10, line 25, insert a comma (,) following "apparent";
          line 41, change "show" to --shoe--;
          line 62, change "with" to --both--.

Column 11, line 55, delete "129" and delete "or";
          line 56, change "119" to --123--.

Column 13, line 63, change "function" to --friction--; and "154" to --154a--.

Column 14, line 28, change "sheel" to --wheel--.

UNITED STATES PATENT AND TRADEMARK OFFICE
CERTIFICATE OF CORRECTION

PATENT NO. : 4,109,934
DATED : August 29, 1978
INVENTOR(S) : Hamilton Neil King Paton, et al.

It is certified that error appears in the above—identified patent and that said Letters Patent is hereby corrected as shown below:

Column 14, line 28, change "sheel" to -- wheel --.

Signed and Sealed this

Eleventh Day of December 1979

[SEAL]

Attest:

SIDNEY A. DIAMOND

Attesting Officer

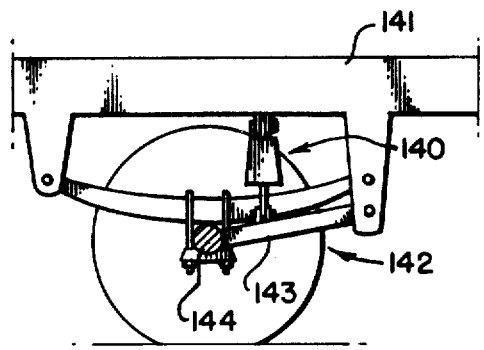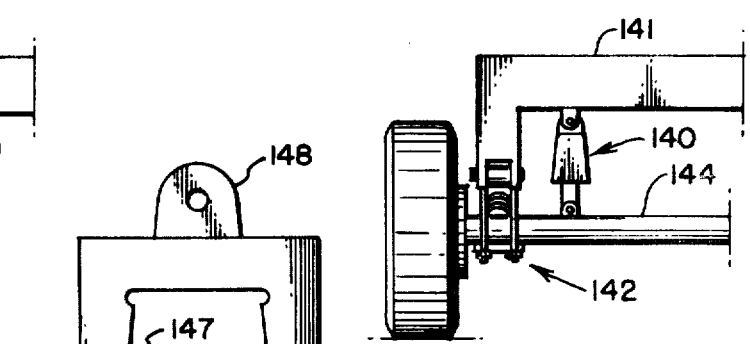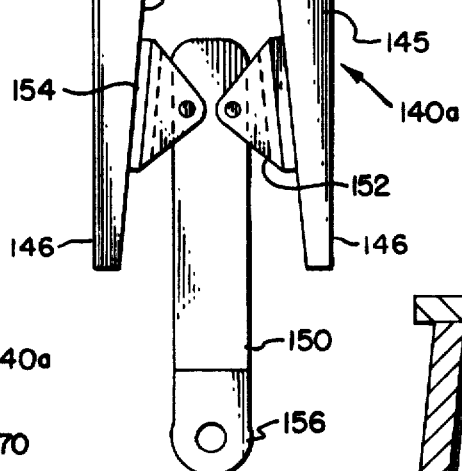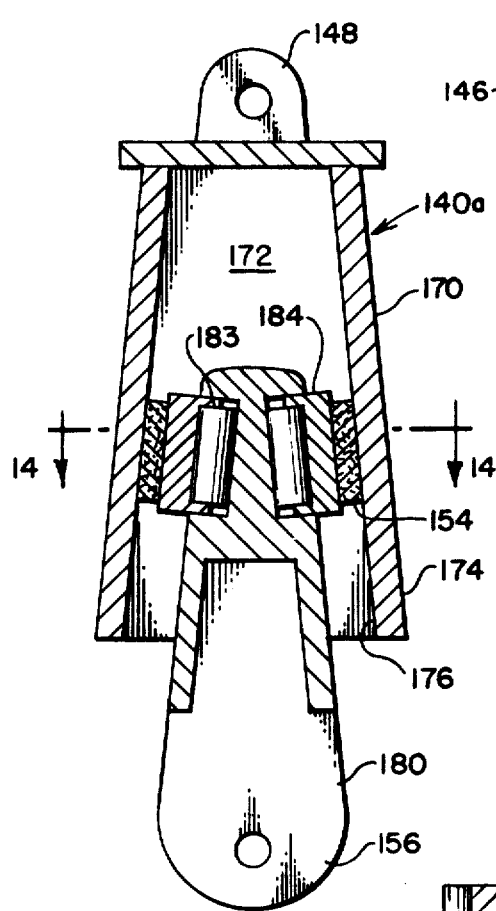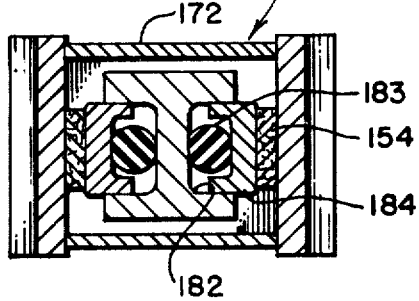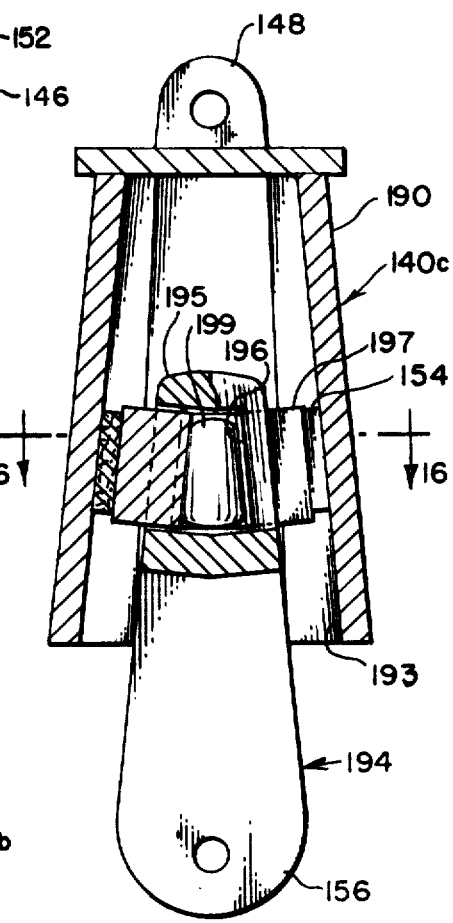

Commissioner of Patents and Trademarks